(12) United States Patent
Sidiropoulos

(10) Patent No.: US 9,515,694 B1
(45) Date of Patent: Dec. 6, 2016

(54) ADAPTABLE RATE TRANSCEIVER

(71) Applicant: nusemi inc., Palo Alto, CA (US)

(72) Inventor: Stefanos Sidiropoulos, Palo Alto, CA (US)

(73) Assignee: nusemi inc., Mountain View, CA (US)

( * ) Notice: Subject to any disclaimer, the term of this patent is extended or adjusted under 35 U.S.C. 154(b) by 0 days.

(21) Appl. No.: 14/811,025

(22) Filed: Jul. 28, 2015

Related U.S. Application Data

(60) Provisional application No. 62/030,336, filed on Jul. 29, 2014.

(51) Int. Cl.
| | | |
|---|---|---|
| *H04B 3/00* | (2006.01) | |
| *H04L 25/00* | (2006.01) | |
| *H04B 1/40* | (2015.01) | |
| *H04L 1/00* | (2006.01) | |
| *H04L 25/03* | (2006.01) | |
| *H04L 12/825* | (2013.01) | |
| *H04L 12/861* | (2013.01) | |

(52) U.S. Cl.
CPC .............. *H04B 1/40* (2013.01); *H04L 1/004* (2013.01); *H04L 25/03* (2013.01); *H04L 47/25* (2013.01); *H04L 49/9005* (2013.01)

(58) Field of Classification Search
CPC ............ H04B 1/40; H04L 1/004; H04L 25/03; H04L 47/25; H04L 49/9005; G06F 13/14; H03F 3/08
USPC ................ 375/257, 259, 265, 341; 710/205; 250/214 A
See application file for complete search history.

(56) References Cited

U.S. PATENT DOCUMENTS

| 2014/0075076 A1* | 3/2014 | Pillai | G06F 13/14 710/305 |
|---|---|---|---|
| 2015/0222236 A1* | 8/2015 | Takemoto | H03F 3/08 250/214 A |

OTHER PUBLICATIONS

"Exponential back-off description," Wikipedia, downloaded from "http://en.wikipedia.org/wiki/Exponential_backoff" on or before Jul. 29, 2014, pp. 1-4.
"IEEE Standard for Ethernet, Amendment 2: Physical Layer Specifications and Management Parameters for 100 Gb/s Operation Over Backplanes and Copper Cables," IEEE Computer Society, IEEE Std 802.3bj™ 2014, pp. 1-368.
Bikash Koley, "Ethernet Evolution and Warehouse Scale Computing," Google Network Architecture, downloaded from "http://www.ethernetalliance.org/wp-content/uploads/2011/12/4-OFC-Bikash-Google-EA-panel1.pdf" on or before Jul. 29, 2014, pp. 1-9.
(Continued)

*Primary Examiner* — Phuong Phu
(74) *Attorney, Agent, or Firm* — Charles Shemwell

(57) ABSTRACT

A transceiver integrated circuit (IC) receives signals having a mix of idle characters and data via a multi-lane system-side signaling interface at a first signaling rate compliant with a standards-based signaling protocol. The transceiver IC outputs signals via a multi-lane line-side signaling interface at a second signaling rate that is lower than the first signaling rate and non-compliant with the standards-based signaling protocol and also outputs one or more requests to a remote IC source of the signals received via the system-side signaling interface to adjust a proportion of idle characters within the received signals as necessary to balance a data rate of the received signals with the second signaling rate without adjusting the first signaling rate.

19 Claims, 1 Drawing Sheet

(56) References Cited

OTHER PUBLICATIONS

M. Mathis et. al., "TCP Selective Acknowledgement Options," Network Working Group, Request for Comments, downloaded from "http://www.ietf.org/rfc/rfc2018.txt" on or before Jul. 29, 2014, pp. 1-12.

P. Hlavka, et. al, "Formal Verification of the CRC Algorithm Properties," downloaded from "http://www.fit.vutbr.cz/~smrcka/pub/fmcrc-MEMICS06.pdf" on or before Jul. 29, 2014, pp. 1-8.

\* cited by examiner

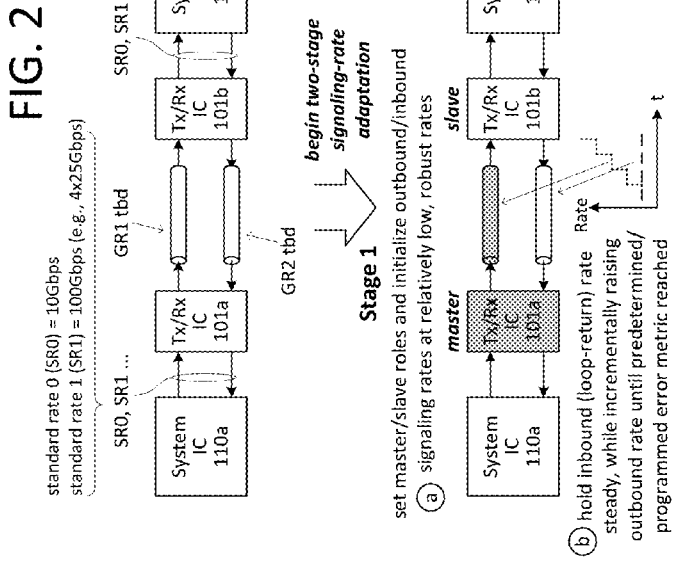
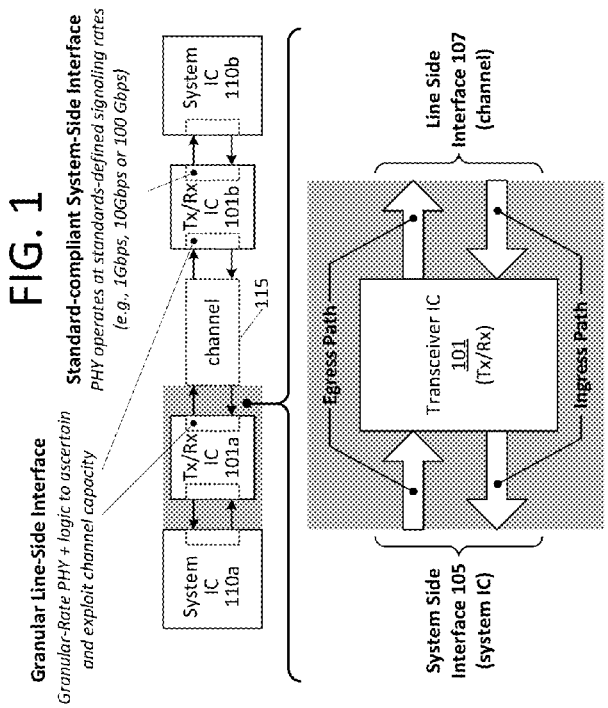

ADAPTABLE RATE TRANSCEIVER

CROSS-REFERENCE TO RELATED APPLICATIONS

This application hereby claims priority to and incorporates by reference U.S. Provisional Application No. 62/030,336, filed Jul. 29, 2014 and entitled "System and Method for Adaptable Rate Transceiver."

TECHNICAL FIELD

The present disclosure relates to physical layer transceivers for network communications and more specifically to increasing the bandwidth available to a transceiver through a communication channel in a network.

BACKGROUND

Ethernet has become the dominant form of transmission of data in networks. The majority of applications involve point to point copper or fiber links with rates varying between 1 Mbit/sec to 100 Mbits/sec, while 400 Gbits/sec Ethernet is under standardization. Due to interoperability concerns Ethernet rates are always fixed mostly in multiples of 10. Physical layer devices (PHYs) can negotiate to communicate at one of the predetermined standard rates: e.g. between 1 Gbit/sec and 10 Gbit/sec. This convention which served the industry well to date, is necessitated mainly by the need to facilitate interoperability between PHYs manufactured by different vendors. However it limits the capacity of networks, by fixing the rate of the links to that prescribed of a standard iteration (i.e. 10 Mbps, 100 Mbps, 1 Gbps, 10 Gbps, 40 Gbps, 100 Gbps, 400 Gbps). That coarse quantization of the data rate leaves a significant portion of the available channel capacity unused, and increases overall cost. For example an Ethernet transceiver rated for 10 Gbps operation can operate at a significantly increased data rate when it interfaces to a channel that has smaller loss than the worst case specification. Moreover, the power dissipation of a transceiver can be significantly reduced when operating at a lower rate, under light traffic conditions. The inefficiency imposed by coarse data rate quantization is suboptimal for large scale datacenter computing, as well as for many other applications. However, the industry standards cannot accommodate "granular rate Ethernet" (or e.g. "granular rate PCIexpress") due to interoperability and complexity concerns—variable rate at the physical layer lever would complicate the design of all network elements: Network Interface Cards (NICs), Switches, Physical Layer Transceiver Devices (PHYs) and Optical Transponder Modules. As a result all Networking Integrated Circuits today operate at one of the predetermined standard rates, despite increased signaling bandwidth available via a higher but non-standard rate on a given channel, or the power savings or other efficiency gain of a lower non-standard rate. The same restrictions apply to all other link level protocols such as PCIe, FibreChannel, SerialRapidIO, CPRI, OBSAI etc.

BRIEF DESCRIPTION OF THE DRAWING

FIG. 1 illustrates an embodiment of a transceiver IC and its disposition at multiple instances within a signaling system otherwise formed by a pair of system ICs and a signaling channel;

FIG. 2 illustrates an exemplary sequence of operations executed within the signaling system of FIG. 1 to adapt the signaling rate of the line-side interfaces within counterpart transceiver ICs and to (or near) the maximum supported by the signaling channel; and FIG. 3 illustrates a signaling system in which pause frames are sent from transceivers and to respective network switch ICs to equalize granular signaling rates over a signaling channel with the standards-compliant signaling rates of the switch ICs.

DETAILED DESCRIPTION

In various embodiments disclosed herein, a physical-interface integrated circuit transceiver ("transceiver IC") is interposed between a standard Ethernet IC and a communication channel to enable signaling over the channel at a variety of non-standard and dynamically varied rates.

FIG. 1 illustrates an embodiment of a transceiver IC 101 and its disposition at multiple instances (101a, 101b) within a signaling system 100 otherwise formed by a pair of system ICs 110a, 110b and a signaling channel 115. As shown, transceiver 101 has a system-side interface 105 to a standard Ethernet IC (e.g. NIC, NPU, Switch) and thereby enable information exchange with the system IC (110a or 110b, referred to generally as system IC 110) at one of the predetermined standard rates. The system side interface consists of one or more electrical lanes (or optical lanes in the case of silicon photonics implementation), e.g. (1-10)× 10 Gbps or (1-4)×25 Gbps. This interface of the transceiver IC connects to a standard Ethernet IC (e.g. switch, NIC or NPU) and thus operated at standard Ethernet rates to enable standards-based interoperability. By contrast, a line side interface 107 of transceiver IC 101, which connects to a multi-lane or single-lane optical or electrical/copper communication channel, can operate at the Ethernet standard rates as well as a variety of non-standard data rates, and thus at rates which constitute a superset of the Ethernet standard. In a "standard-compliant" mode of operation, the line side interface 107 utilizes standards-compliant encoding and modulation schemes (e.g. 64/66b, NRZ, PAM-4), and packet formats. Accordingly, when the proposed transceiver IC operates in the standard-compliant mode it is fully compatible with standards-based transceiver chips. However, when configured in an alternative "granular" mode of operation, line side interface 107 may utilize proprietary encoding, modulation schemes and packet formats (e.g. 65/66b, PAM-3, NRZ, QAM etc.) and/or operate at a non-standard data rate. Thus, when operated in granular mode, physical layer transceiver IC effectively enables standard connectivity chips (NICs, switches, etc.) to interface with communication channels operated at non-standard and granular data rates, yielding increased overall network performance at decreased cost. In general, the granular mode of operation is enabled only when the transceiver IC communicates with an identical or compatible transceiver IC residing at the other side of the channel, or an IC that implements the transceiver IC functionality described herein.

In the proposed system, the aggregate data rate supported by the system side interface (i.e., sum of Ethernet-standard rates of constituent lanes), sets the maximum data rate than can be supported by the line side interface. The line side interface has the capability to adapt the data rate in continuous or very small increments so as to better track the capacity of the communication channel. This is accomplished by communicating with the transceiver or transceivers at the other side of the channel, both during system startup and during normal system operation. The metric that is used to set the line side data rate can be, for example and without limitation, the received signal to noise ratio (SNR), Bit Error Rate (BER—measured either directly or by a "margin" proxy), and/or a higher layer metric such as Frame Error Rate (FER—measured directly by employing the frame check sequence at the receiving end).

FIG. 2 illustrates an exemplary sequence of operations executed within the signaling system 100 of FIG. 1 to adapt the signaling rate of the line-side interfaces within counterpart transceiver ICs 101a and 101b to (or near) the maximum supported by channel 115.

Upon system startup the transceivers within the transceiver ICs (or PHY functional elements) at both ends of the channel operate at a minimum or relatively low data rate and with a predetermined encoding scheme. That initial mode of operation is programmable to a slow enough data rate that is deemed robust by the user/designer of the system (e.g. if the intended maximum data rate of a link is 20 Gbps the initial data rate can be set to 10 Gbps or even 1 Gbps), thus ensuring communications for rate adaption purposes. As shown, the system-side interface of each transceiver may be operated at any of various standard rates, of which two exemplary standard rates (SR0=10 Gbps and SR1=100 Gbs) are shown.

At stage 1 of a two-stage signaling rate adaptation, one of the two transceivers (i.e., transceiver 101a in this example) is designated the master of the link, for example, through auto negotiation employing exponential back-off, static assignment/convention based on the network topology (e.g. transceivers closer to network "leaf" nodes are generally designated as "master", while transceivers close to the network "root" nodes are designated as "slaves") or any other initial-master designation technique.

After establishing initial master and slave roles between transceivers 101a and 101b, master transceiver 101a sends a pre-determined data sequence to slave transceiver 101b that exercises the channel capacity. That data sequence can be, for example and without limitation, a pseudo-random bit sequence (PRBS), a predetermined sequence of packets, etc., and can be programmed upon transceiver reset. The receiving/slave transceiver 101b estimates the metric of communication robustness (e.g., SNR, BER, FER) based on the pre-determined sequence. In case the metric has not yet met a pre-programmed target or limit, the receiving transceiver signals the sending transceiver to increase the sending data rate (i.e., indicates to the sending transceiver that additional headroom remains for increasing the signaling rate). The sending transceiver, in response, incrementally increases the outbound signaling rate and the process is repeated until the desired goal has been met (e.g. the SNR has dropped below a target or threshold value or the BER/FER has increased above a target value). During this iterative process the slave to master transceiver data rate (i.e., the inbound signaling rate from the perspective of the master transceiver IC 101a) is maintained at the initial slower data rate to ensure that the intra-transceiver feedback path is robust.

After the maximum "granular" data rate on one transmission direction of the link (i.e., "GR1") has been determined, the iterative outbound rate-setting process is repeated for the other transmission direction. In one embodiment, for example, the transceiver ICs (or PHY functional elements) at either end of the link swap the roles of "master" and "slave" transceivers and then repeat the iterative rate determination as shown at stage 2 of FIG. 2, thus yielding a return-direction granular rate, GR2. Note that GR1 and GR2 may be uniform on a symmetric channel and given transceiver ICs with similar capabilities (e.g., termination symmetry, transceiver circuit symmetry, etc.), but that need not be the case in all embodiments, or at all times within a given embodiment (i.e., GR1 may be greater than GR2 or vice-versa).

Once this initial calibration of the data rate to the available channel capacity in both directions has been accomplished, the transceiver ICs or PHY functional elements enter normal operation (i.e., live data transfer). In one embodiment, link robustness in each direction is continuously monitored during normal operation, and can be adjusted up or down either by the system software or by directly signaling the transceiver partner using predetermined control characters or packets.

During normal transceiver IC or system operation, the incremental adjustments to the signaling rate are gradual (e.g., incremental) such that they do not result in instantaneous loss of communication ("link down"). In one embodiment, this is accomplished by utilizing wide-range tracking phase locked loops and clock and data recovery circuits at the line side interface. In case different modulation and/or encoding is employed when the data rate is adjusted, the seamless adjustments of data rate are accomplished by speculatively enabling both types of decoders/demodulators and switching from one to the other at the receiver side, once the transition from one format to the other has been detected.

The varying data rate of the transceiver IC line side transceiver means that the effective egress payload data rate via the system-side interface needs to be constrained such that it does not exceed the line-side data rate, while the aggregate system-side data rate remains compatible with a standard protocol rate. In a number of embodiments, this is achieved by equalizing the ratio of packet data rate via the line-side interface to the sum of packet data and idle (or null) character transmission rates via the system-side interface. This is throughput balancing may be accomplished in a number of ways including, for example and without limitation, by:

The system software which can limit the actual payload rate transmitted by the standard system IC. This may be done by varying the ratio of useful payload data to idle characters through programming the transmit Media Access Controller Interpacket Gap (IPC); or by Integrating an egress and ingress FIFO memories in the transceiver and sending flow control (e.g. PAUSE) frames from the transceiver to the standards compliant system IC.

Each of the above methods is transparent to the system ICs and interoperable with standards-compliant systems.

FIG. 3 illustrates a signaling system 150, for example, in which pause frames are sent from transceivers 151a and 151b to network switch ICs 160a an 160b (examples of system ICs) to equalize granular signaling rate GR1 with the standards-compliant outbound signaling rate of switch IC 160a and inbound signaling rate of switch IC 161b (both SR1), and correspondingly equalize granular signaling rate GR2 with standards-compliant inbound signaling rate of switch IC 160a and outbound signaling rate of switch IC 161b (both also SR1 in this example). As shown, both GR1 and GR2 are somewhat less than SR1 (an imposition of the limited channel bandwidth), but greater than the next-step-down (i.e., next available lower) standards-compliant rate SR0.

The system described so far, while employing non-standard data rate on the line side does not alter the basic Ethernet packet/frame format or payload. However, the flexibility and robustness of the system can be greatly expanded if the transceiver IC alters the standard frame format. For example, one of the constraints of Ethernet standard Bit Error Rate goals is dictated by the Mean Time To False Packet Acceptance, i.e. the mean time that a bit error, or burst of errors cannot be detected by the standard CRC-32 Ethernet Frame Check Sequence (FCS). The proposed transceiver IC transceiver, however, may operate at a higher BER/FER if it alters the line side FCS from e.g. CRC-32 to a more capable check sequence such as CRC-64 [3], which dramatically increases the mean time to false packet acceptance and increases the system robustness. Employing an FCS with greater Hamming Distance on the line side, and substituting it with the standard FCS on the system side is also transparent and interoperable with the rest of the system. The only requirement is that the PHY transceiver substitutes the FCS of the packets before they get transmitted to the system side with the standard FCS. Corrupted frames (as detected by the line side FCS) can either be dropped at the transceiver, or transmitted to the system side interface with a corrupted standard FCS. The former option incurs latency, while the latter uses some system side bandwidth by transmitting corrupted frames. The transceiver can employ either one of the methods depending on system configuration. The use of a non-standard FCS, in certain systems, can be extended by implementing a retransmission scheme for frames that are detected to contain errors. In that case, the format of the header of the non-standard line-side Ethernet frames is augmented with a sequence identifier (e.g.. 16-bits), which is used by the receiving side transceiver to request a retransmission of the frames that are detected to contain errors. This link level Automatic Repeat ReQuest (ARQ) method can greatly enhance the network performance, especially when combined with operating the transceiver closer to the maximum capacity of the channel, as well as at a higher BER than currently contemplated by the Ethernet standard. Such link level retransmissions can be very effective in increasing overall network performance. While interactions with higher layer protocols such as TCP may raise complications, such interactions tend to be limited in low end-to-end latency environments such as data-center networks. Also, in those limited cases, variants of TCP may be implemented that are impervious to link level retransmission and re-ordering of link layer packets.

It should be noted that numerous modifications can be made to the functionality described herein including, for example and without limitation, the following non-exhaustive examples:

The line side transmission can contain non-standard Forward Error Correction. For example a short Reed Solomon Code such as RC(31,29) can be used to minimize end-to-end latency. Short packets containing intra-transceiver signaling (such as rate control and ARQ can be encoded with an even higher gain code e.g. RS(7,3) to ensure reliable communication at increased BER.

The line side data rate control loop can be implemented both on the transceiver IC itself, or alternatively the transceiver can only provide the necessary information and control facilities to the system software, which performs the data rate optimization Embodiments of adaptable rate transceiver have been described herein in the context of Ethernet, since Ethernet is currently the most prevalent network communication interface. However, the techniques described herein are generally applicable to any high speed packetized link level protocol (e.g. Fibre Channel, PCIe or any other standard non-standard packetized link-level wireline communication protocol), and not limited to Ethernet compatible networks. Thus, the term "Ethernet" as used herein should be understood to include, not only networks and signaling protocols according to various Ethernet standards, but also any exemplary link level packetized protocol and signaling system employing same.

The adaptive rate transceiver has been described in this document as a distinct IC. However the functionality described in this document, can be implemented in a block (IP subsystem) integrated within a larger IC or system on a chip, or as a "chiplet" in a 2.5-D or 3-D integrated circuit that also embeds channel specific functionality—e.g. silicon photonics blocks interfacing to an optical fiber channel.

It should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits can be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image can thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply specific details that are not required to practice those embodiments. For example, the term "granular" is used herein to mean capable of fine resolution (e.g., a granular signaling rate may be resolved to any of numerous signaling rates ranging inclusively between upper and lower standards-compliant signaling rates) including, but not limited to, resolution to any value within a continuous range (e.g., any signaling rate within a continuous range of signaling rates). Further, any of the specific signal path widths or lane counts, signaling or operating frequencies, component circuits or devices and the like can be different from those described above in alternative embodiments. Additionally, links or other interconnection between integrated circuit devices or internal circuit elements or blocks may be shown as buses or as single signal lines. Each of the buses can alternatively be a single signal line, and each of the single signal lines can alternatively be buses. Signals and signaling links, however shown or described, can be single-ended or differential. A signal driving circuit is said to "output" a signal to a signal receiving circuit when the signal driving circuit asserts (or de-asserts, if explicitly stated or indicated by context) the signal on a signal line coupled between the signal driving and signal receiving circuits. The term "coupled" is used herein to express a direct connection as well as a connection through one or more intervening circuits or structures. Integrated circuit device "programming" can include, for example and without limitation, loading a control value into a register or other storage circuit within the integrated circuit device in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "light" as used to apply to radiation is not limited to visible light, and when used to describe sensor function is intended to apply to the wavelength band or bands to which a particular pixel construction (including any corresponding filters) is sensitive. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. A transceiver integrated circuit (IC) comprising:
a system-side signaling interface having a plurality of system-side signaling lanes and transceiver circuitry to receive and output signals via the system-side signaling lanes at one or more standards-based signaling rates specified by an industry interoperability standard;
a line-side signaling interface having a plurality of line-side signaling lanes and transceiver circuitry to receive and output signals via the line-side signaling lanes at one or more signaling rates non-compliant with the standards-based signaling rates, the signals received via the line-side signaling lanes including information to be conveyed in the signals output via the system-side signaling lanes, and the signals received via the system-side signaling lanes including information to be conveyed in the signals output via the line-side signaling lanes; and
wherein the transceiver circuitry to receive and output signals via the line-side signaling lanes at one or more signaling rates non-compliant with the standards-based signaling rates comprises circuitry to incrementally adjust the signaling rate of the signals received and output via the line-side signaling lanes over a time interval during which the signals received and output via the system-side signaling lanes are received and output at a fixed standards-based signaling rate.

2. The transceiver IC of claim 1 wherein at least one of the system-side signaling interface and the line-side signaling interface comprises an optical signaling interface.

3. The transceiver IC of claim 1 wherein at least one of the system-side signaling interface and the line-side signaling interface comprises an electrical signaling interface.

4. The transceiver IC of claim 1 wherein at least one of modulation or encoding of the signals output via the line-side signaling interface is non-compliant with the industry interoperability standard that specifies the one or more standards-compliant signaling rates.

5. The transceiver IC of claim 1 wherein the signals received and output via the line-side signaling interface constitute packetized information conveyed in discrete frames, and wherein a format of the discrete frames is non-compliant with the industry interoperability standard that specifies the one or more standards-compliant signaling rates.

6. The transceiver IC of claim 5 wherein a minimum hamming distance of all possible transmitted frames is substantially different from a minimum hamming distance of all possible frames transmitted in accordance with industry interoperability standard.

7. A transceiver integrated circuit (IC) comprising:
a system-side signaling interface having a plurality of system-side signaling lanes and transceiver circuitry to receive and output signals via the system-side signaling lanes at one or more standards-based signaling rates specified by an industry interoperability standard;
a line-side signaling interface having a plurality of line-side signaling lanes and transceiver circuitry to receive and output signals via the line-side signaling lanes at one or more signaling rates non-compliant with the standards-based signaling rates, the signals received via the line-side signaling lanes including information to be conveyed in the signals output via the system-side signaling lanes, and the signals received via the system-side signaling lanes including information to be conveyed in the signals output via the line-side signaling lanes; and
wherein the line-side signaling interface implements forward error correction with a substantially different encoding gain than a forward error correction implemented by the system-side signaling interface.

8. A transceiver integrated circuit (IC) comprising:
a system-side signaling interface having a plurality of system-side signaling lanes and transceiver circuitry to receive and output signals via the system-side signaling lanes at one or more standards-based signaling rates specified by an industry interoperability standard;
a line-side signaling interface having a plurality of line-side signaling lanes and transceiver circuitry to receive and output signals via the line-side signaling lanes at one or more signaling rates non-compliant with the standards-based signaling rates, the signals received via the line-side signaling lanes including information to be conveyed in the signals output via the system-side signaling lanes, and the signals received via the system-side signaling lanes including information to be conveyed in the signals output via the line-side signaling lanes; and
data transfer equalization logic that adjusts an effective data transfer rate of the signals received and output via the system-side signaling lanes according to a bandwidth of a signaling channel to which the line-side signaling lanes are to be coupled.

9. The transceiver IC of claim 8 wherein the data transfer equalization logic substantially equalizes average non-idle data signaling rates of the system-side and line-side signaling interfaces.

10. A method of operation within a transceiver integrated circuit (IC) having a system-side signaling interface and a line-side signaling interface, the method comprising:
    receiving and outputting signals via constituent system-side signaling lanes of the system-side signaling interface at one or more standards-based signaling rates specified by an industry interoperability standard;
    receiving and outputting signals at one or more non-standards-compliant signaling rates via constituent line-side signaling lanes of the line-side signaling interface, including receiving information via the line-side signaling lanes to be conveyed in the signals output via the system-side signaling lanes and conveying information received via the system-side signaling lanes in the signals output via the line-side signaling lanes; and
    wherein receiving and outputting signals via the line-side signaling lanes at one or more signaling rates non-compliant with the standards-based signaling rates comprises incrementally adjusting the signaling rate of the signals received and output via the line-side signaling lanes over a time interval during which the signals received and output via the system-side signaling lanes are received and output at a fixed standards-based signaling rate.

11. The method of claim 10 wherein at least one of the system-side signaling interface and the line-side signaling interface comprises an optical signaling interface.

12. The method of claim 10 wherein at least one of the system-side signaling interface and the line-side signaling interface comprises an electrical signaling interface.

13. The method of claim 10 wherein at least one of modulation or encoding of the signals output via the line-side signaling interface is non-compliant with the industry interoperability standard that specifies the one or more standards-compliant signaling rates.

14. The method of claim 10 wherein the signals received and output via the line-side signaling interface constitute packetized information conveyed in discrete frames, and wherein a format of the discrete frames is non-compliant with the industry interoperability standard that specifies the one or more standards-compliant signaling rates.

15. The method of claim 14 wherein a minimum hamming distance of all possible transmitted frames is substantially different from a minimum hamming distance of all possible frames transmitted in accordance with the industry interoperability standard.

16. A method of operation within a transceiver integrated circuit (IC) having a system-side signaling interface and a line-side signaling interface, the method comprising:
    receiving and outputting signals via constituent system-side signaling lanes of the system-side signaling interface at one or more standards-based signaling rates specified by an industry interoperability standard;
    receiving and outputting signals at one or more non-standards-compliant signaling rates via constituent line-side signaling lanes of the line-side signaling interface, including receiving information via the line-side signaling lanes to be conveyed in the signals output via the system-side signaling lanes and conveying information received via the system-side signaling lanes in the signals output via the line-side signaling lanes; and
    implementing forward error correction within the line-side and system-side signaling interfaces, including implementing forward error correction within the line-side signaling interface with a substantially different encoding gain than in the forward error correction implemented within the system-side signaling interface.

17. A method of operation within a transceiver integrated circuit (IC) having a system-side signaling interface and a line-side signaling interface, the method comprising:
    receiving and outputting signals via constituent system-side signaling lanes of the system-side signaling interface at one or more standards-based signaling rates specified by an industry interoperability standard;
    receiving and outputting signals at one or more non-standards-compliant signaling rates via constituent line-side signaling lanes of the line-side signaling interface, including receiving information via the line-side signaling lanes to be conveyed in the signals output via the system-side signaling lanes and conveying information received via the system-side signaling lanes in the signals output via the line-side signaling lanes; and
    adjusting an effective data transfer rate of the signals received and output via the system-side signaling lanes according to a bandwidth of a signaling channel to which the line-side signaling lanes are coupled, including equalizing average non-idle data signaling rates of the system-side and line-side signaling interfaces.

18. The transceiver IC of claim 1 wherein the industry interoperability standard is an Ethernet standard.

19. The method of claim 10 wherein the industry interoperability standard is an Ethernet standard.

* * * * *